(12) United States Patent
Tzannakos

(10) Patent No.: US 10,878,376 B2
(45) Date of Patent: Dec. 29, 2020

(54) METHOD AND SYSTEM TO AUTOMATICALLY TRACK AND MANAGE ASSETS USING MOBILE DEVICES

(71) Applicant: Component Sourcing Group, Laguna Hills, CA (US)

(72) Inventor: Patricia Tzannakos, San Juan Capistrano, CA (US)

(73) Assignee: Component Sourcing Group, Laguna Hills, CA (US)

( * ) Notice: Subject to any disclaimer, the term of this patent is extended or adjusted under 35 U.S.C. 154(b) by 0 days.

(21) Appl. No.: 16/424,286

(22) Filed: May 28, 2019

(65) Prior Publication Data

US 2019/0279148 A1  Sep. 12, 2019

Related U.S. Application Data

(63) Continuation of application No. 14/460,310, filed on Aug. 14, 2014, now Pat. No. 10,304,030.

(60) Provisional application No. 61/866,538, filed on Aug. 15, 2013.

(51) Int. Cl.
*G06Q 10/08* (2012.01)

(52) U.S. Cl.
CPC .................. *G06Q 10/087* (2013.01)

(58) Field of Classification Search
CPC .................................... G06Q 10/087
USPC .......................................... 235/385
See application file for complete search history.

(56) References Cited

U.S. PATENT DOCUMENTS

| | | |
|---|---|---|
| 6,195,006 B1 | 2/2001 | Bowers et al. |
| 7,466,232 B2 | 12/2008 | Neuwirth |
| 7,957,990 B2 | 6/2011 | Hawkins et al. |
| 8,370,225 B2 | 2/2013 | Davis, Jr. et al. |
| 9,087,315 B1 | 7/2015 | Meyers |
| 2004/0078282 A1 | 4/2004 | Robinson |
| 2007/0239569 A1 | 10/2007 | Lucas et al. |
| 2009/0327102 A1 | 12/2009 | Maniar et al. |
| 2010/0090004 A1 | 4/2010 | Sands et al. |
| 2015/0356520 A1* | 12/2015 | Mitti ............... G06Q 10/087 705/305 |
| 2016/0180265 A1* | 6/2016 | Yanicke ............ G06Q 10/025 705/7.28 |

OTHER PUBLICATIONS

U.S. Appl. No. 14/460,310, filed Aug. 14, 2014, Patricia Tzannakos, Office Action dated Oct. 26, 2015; Aug. 18, 2016; Dec. 8, 2017, Final Office Action dated Feb. 2, 2016; Apr. 11, 2017; May 14, 2018, Notice of Allowance dated Jan. 18, 2019.

* cited by examiner

*Primary Examiner* — Daniel A Hess
(74) *Attorney, Agent, or Firm* — Klein, O'Neill & Singh, LLP

(57) ABSTRACT

A method and system to automatically track and manage assets. The method tracks a plurality of assets automatically through a mobile device. Further, the method provides alerts automatically based on data associated to the plurality of assets through the mobile device. Furthermore, reports are generated automatically through the mobile device for a plurality of Asset management processes thereby achieving complete accountability through the mobile device.

12 Claims, 11 Drawing Sheets

METHOD AND SYSTEM TO AUTOMATICALLY TRACK AND MANAGE ASSETS USING MOBILE DEVICES

CROSS-REFERENCE TO RELATED APPLICATION

The present application is a continuation of U.S. patent application Ser. No. 14/460,310, filed Aug. 14, 2014, which claims priority to U.S. provisional patent application Ser. No. 61/866,538, filed on Aug. 15, 2013. The entirety of each of the priority application is hereby incorporated by reference.

FIELD OF THE ART

The present invention relates generally to Radio Frequency Identification (RFID) technology and more particularly to track Government assets through a handheld device using RFID.

BACKGROUND

Tracking assets and managing inventory are vital in today's growing economy system. New products are developed constantly and are placed in the market for consumers to purchase. The increasing number of products needs to be managed efficiently by business people (retailers, wholesalers, market executes) while receiving, shipping, and storing the products in a warehouse.

Traditionally, tracking assets and managing inventory in retail supply chain or manufacturing units or service units heavily depend on manual scanning of barcodes printed on each product. The manual scanning becomes monotonous as the number of products increase and hence time consuming. To overcome limitations of the manual process, smart tags, like passive RFID, which broadcast corresponding to locations, are used. Other methods to track assets involve using QR codes and Global Positioning System (GPS) technology. Further, RFID-based solutions can record location of assets, usage of assets and generate various reports manually and automatically. Further, RFID solution is fast, secure and reliable resulting in tremendous gain in Return on Investment (ROI). However, a number of asset management procedures (or processes), for example DRMO/Disposal process, Recycle process, Spare Lockers procedure, check-out and check-in process are manually performed. As a result, the asset management procedures are not only tedious but are also ineffective. Further, the asset management procedures and do not provide complete accountability.

From the foregoing, it may be appreciated by those skilled in the art that a need has arrived for a system and method to completely automate the process of RFID asset tracking and Inventory management providing the user with a one stop program.

OBJECT OF INVENTION

The principal object of the embodiments herein is to provide a method and system to automatically track assets and manage inventory using a handheld device, such as an HTC mobile device, or a desktop application.

Another object of the invention is to completely automate the Government asset management processes through the handheld device and have complete accountability of all assets.

SUMMARY

The above-mentioned needs are met by a computer-implemented method, a computer program product and a system for automatically track and manage assets using mobile devices.

An example of a computer-implemented method for automatically tracking and managing assets using mobile devices includes, tracking a plurality of assets automatically through a mobile device. Further, the computer-implemented method includes providing alerts automatically based on data associated to the plurality of assets through the mobile device. Furthermore, the computer-implemented method includes generating reports automatically through the mobile device for a plurality of Asset management processes thereby achieving complete accountability through the mobile device.

An example of a computer program product stored on a non-transitory computer-readable medium that when executed by a processor, performs a method for automatically tracking and managing assets using mobile devices includes tracking a plurality of assets automatically through a mobile device. Further, the computer program product includes providing alerts automatically based on data associated to the plurality of assets through the mobile device. Furthermore, the computer program product includes generating reports automatically through the mobile device for a plurality of Asset management processes thereby achieving complete accountability through the mobile device.

An example of a system for automatically tracking and managing assets includes a plurality of assets wherein the assets hold RFID tags. Further the system includes a plurality of mobile devices and a plurality of desktop devices to track assets automatically. The mobile devices and desktop devices are configured with RFID readers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Radio Frequency Identification (RFID) is a wireless use of radio-frequency (RF) signals to transfer data for purposes of automatically identifying and tracking tags attached to objects. Typically, the tags (also referred to as labels) contain electronic information specific to the object in which it is attached. RFID tags can be passive, active or battery-assisted passive. An RFID reader transmits an encoded RF signal to interrogate the tag. The RFID tags respond by transmitting an encoded RF signal including its identification number and other information. The information may be a unique tag serial number or product related information such as a stock number, batch number, production date or other specific information. RFID technology is widely used in tracking assets and managing inventory.

Figure 1:
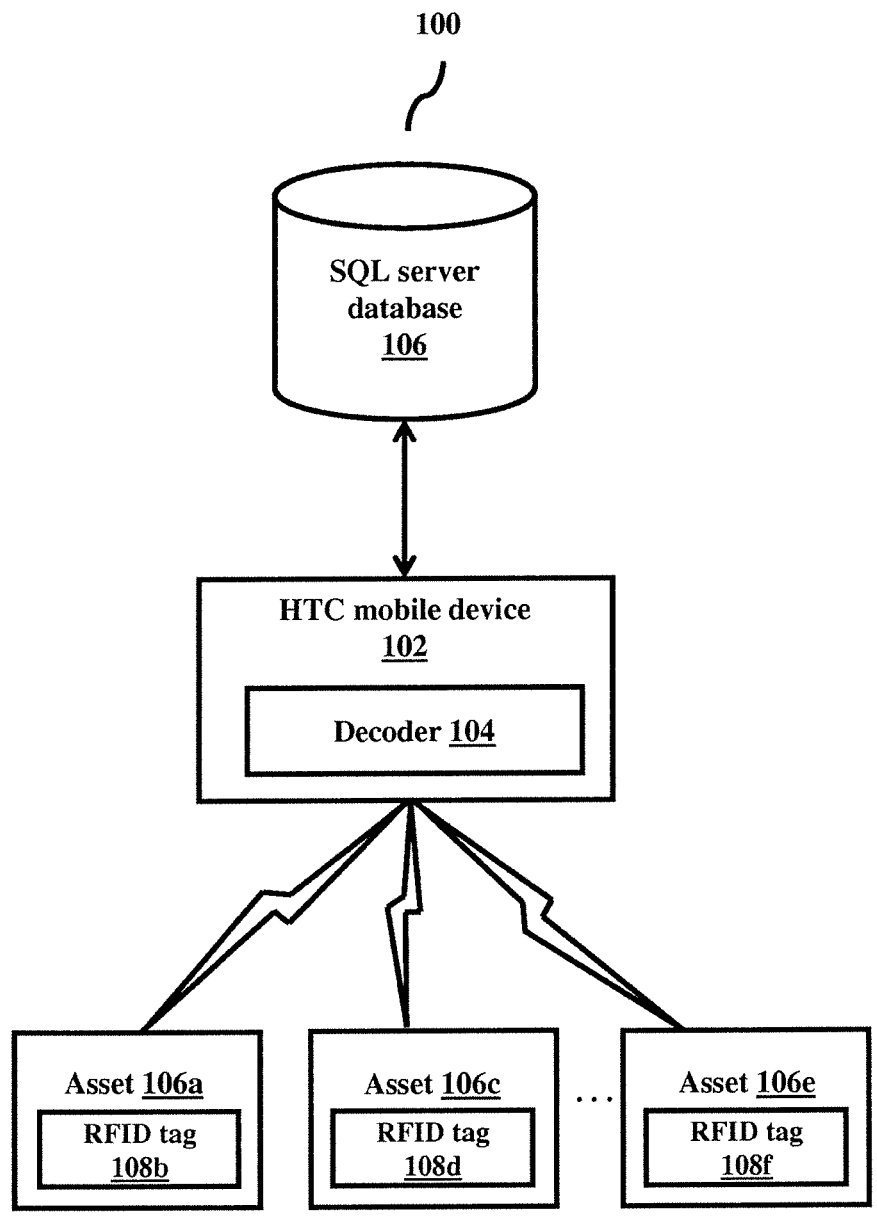
FIG. 1 illustrates a block diagram of an environment, according to the embodiments as disclosed herein.

FIG. 1 illustrates a block diagram of an environment, according to the embodiments as disclosed herein. The environment 100 comprises a mobile device 102 that receives Radio Frequency (RF) signals from a plurality of assets, for example, asset 106a, asset 106c and asset 104e. In a preferred embodiment, the assets are Government assets that are owned by federal, state or local governments. Examples of Government assets include, but are not limited to, residential land, commercial land, industrial land and physical assets. Typically, the mobile device 102 functions as a Radio Frequency Identification (RFID) reader to automatically identify and track RFID tags (or labels) attached to the plurality of assets. Examples of the RFID tags corresponding to the assets include RFID tag 108b, RFID tag 108d and RFID tag 108f. The RFID tags contain electronically stored information. The mobile device 102 includes a decoder 104 to decode RF signals received from the RFID tags. Further, the mobile device 102 is connected to a database 106 such as an SQL server. The database 106 is a data repository and is responsible to store the information decoded from the RFID tags.

Generally, an RFID tag is an electronic radio transmitter comprising of a micro-chip, an antenna and a tiny battery, enclosed on a thin plastic sheet. The RFID tags can be fitted easily on objects. Further, the RFID tags include a memory that stores a unique identification number and periodically transmits a signal.

Typically, the RFID tags remain in a sleep state until a very low frequency (VLF) signal activates the RFID tags. The VLG signal is received from a RFID reader, the mobile device 102. Consequently, the tags emit an ultra-high frequency (UHF) radio signal. The UHF radio signal includes a unique identification number along with other data in an encoded format. The mobile device reader accepts and decodes the UHF signal and further, stores it in the database 106. Frequently, the mobile device 102 transmits encoded RF signals to identify assets. As a result, using RFID tags and readers, assets can be secured and tracked automatically during repeated movements.

Additional details of the environment 100 are given below, in connection with FIG. 2.

Figure 2:
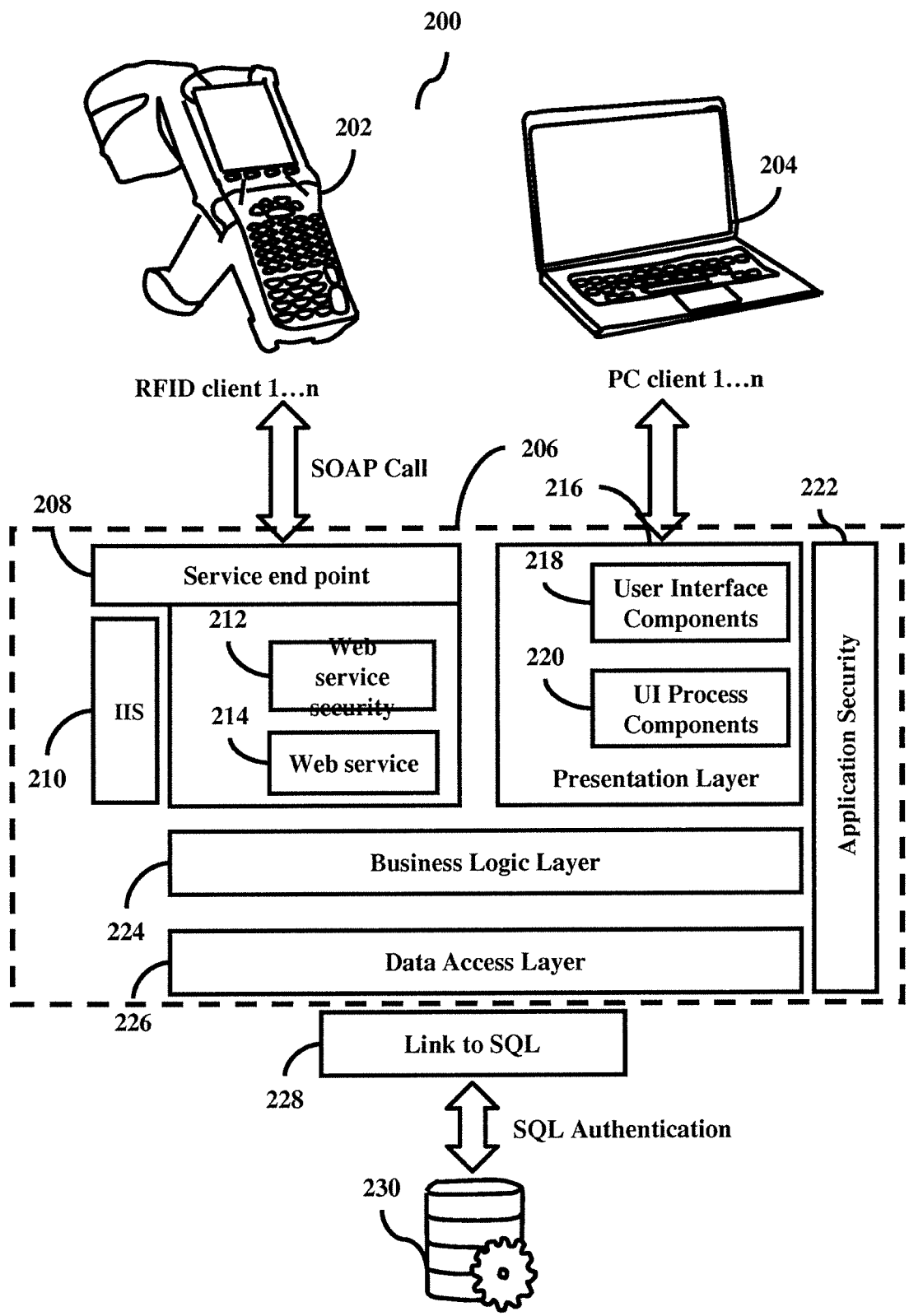
FIG. 2 illustrates a high level block diagram of the environment, according to the embodiments as disclosed herein.

FIG. 2 illustrates a high level block diagram of the environment, according to the embodiments as disclosed herein. The high level block diagram illustrates the architecture of Asset Tracking application 206 used to perform the method disclosed herein. The environment 200 includes a plurality of RFID Clients, for example RFID client 202 and a plurality of Personal Computer (PC) Clients, for example PC client 204. Typically, the RFID client 202 and the PC client 204 are configured with the Asset Tracking application 206.

The RFID Client 202 communicates with a service endpoint 208. The service end point 208 includes web services, for example http://www.assettrackingservice.com. Typically, RF signal received from RFID tags are decoded and information is transferred to the Asset Tracking Web service via Simple Object Access Protocol (SOAP) call. The SOAP is a protocol specification for exchanging structured information in the field of web services in computer networks. It works on XML Information Set for its message format. The service endpoint 208 includes IIS 210, Web Service Security 212 and Web Service 214.

The PC clients, for example PC client 204 are configured with an Asset Tracking Desktop Application installed in Presentation Layer 216. Basically, tracking assets and managing inventory is performed by the Asset Tracking Desktop Application. Further, the Presentation Layer 216 includes User Interface Components 218 and User Interface Process Components 220.

The subsequent layers include Business Logic Layer 224 and Data Access Layer 226. Further, the Asset Tracking Application 206 includes Application Security 222. The Data Access Layer 226 provides a link to a database 230. The database 230 stores information of all assets and facilitates to provide the information to generate reports automatically.

Figure 3:
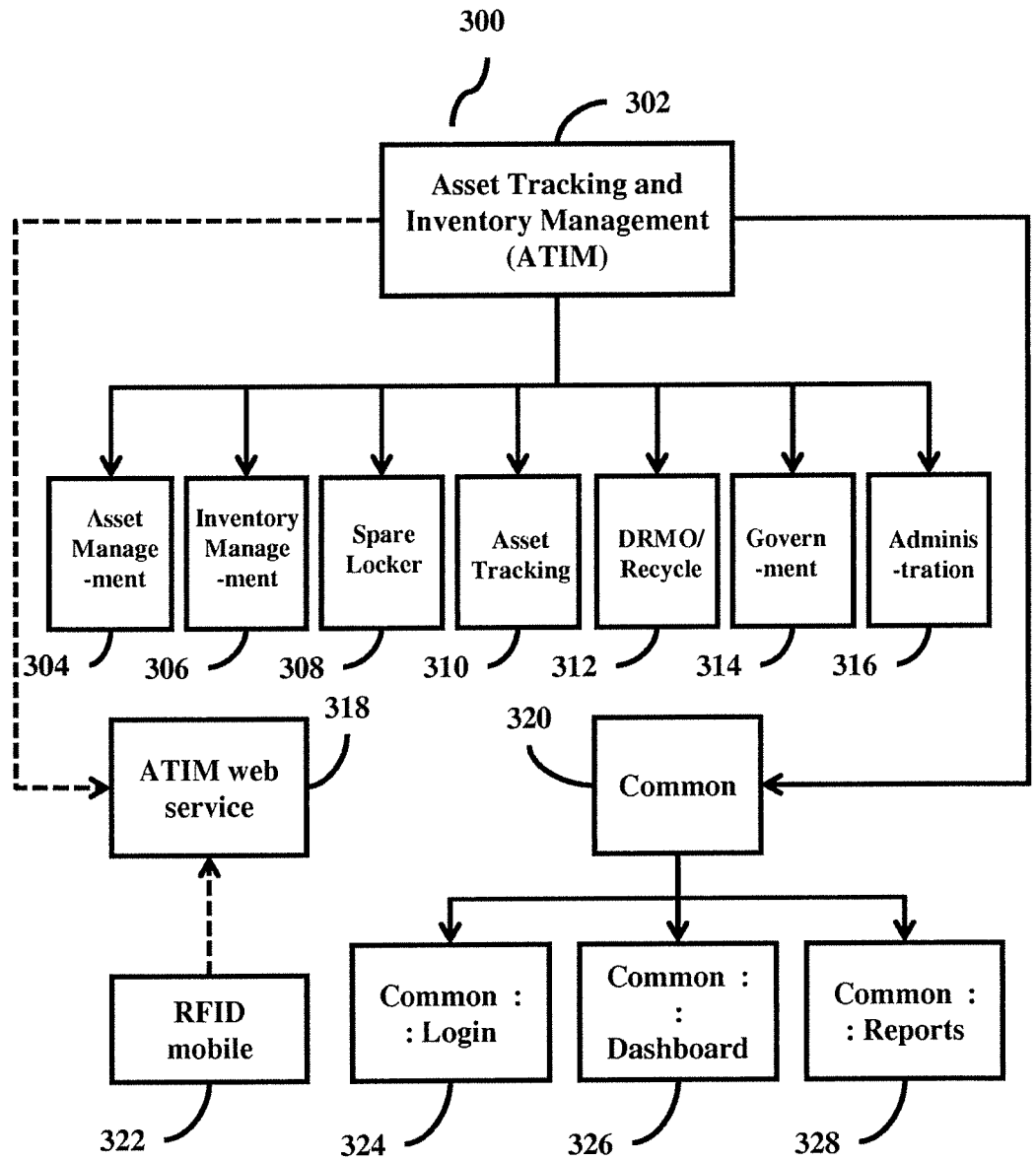
FIG. 3 illustrates a block diagram of the system architecture, according to the embodiments as disclosed herein.

FIG. 3 illustrates a high level module diagram of the system architecture, according to the embodiments as disclosed herein. The high level module diagram 300 includes an Asset Tracking and Inventory Management (ATIM) module 302 that forms the subsystem. Further, the ATIM module 302 forms the logical grouping for all modules that realize the ATIM process.

The ATIM module 302 includes a plurality of processes. The processes include Asset Management Process 304, Inventory Management Process 306, Spare Locker Process 308, Asset Tracking Process 310, DRMO/Disposal or Recycle process 312, Government process 314 and Administration process 316.

The Asset Management Process 304 module includes Manufacturers, Vendors, Customer, Customer Notes, Asset Categories, Add New Asset, Manage Assets and Print Asset Labels processes.

The Inventory Management Process 306 module includes manage locations, location types, location groups, print location barcode, manage inventory, add inventory, view history, single move, mass move, print tracking barcodes, physical count, search inventory, search result, advance shipping list, receive shipment and condition processes.

The Spare Locker Process 308 module includes manage spare locker, add to spare locker, creates trouble ticket, manage trouble ticket, and check out trouble ticket processes. Further, form 1348 is created for Check out Spare locker. The Spare Locker Process is a desktop application. Further, the 1348 form is automatically generated along with a trouble ticket.

The Asset Tracking Process 310 module includes New Sales Order, Manage Sales Order, Inventory Status, Create Pick List, Manage Pick List, Batch Picking, Assisted Picking, Check Out, Check Out Network, Check Out From Pick List, Check In, Check Out/Check In History, Check Out Projects, View & Print Reservations, Add New Reservation and Check Out Legacy processes. Further, projects are allocated based on the check-in process through the mobile device and desktop application program. Subsequently, assets are assigned to a specific project based on received assets. During check-out process, 1348 form is generated automatically and the assets are split based on the type of assets. Further, the form is saved as a Portable Document File (pdf).

The DRMO or Recycle process 312 module includes Manage DRMO, Add New DRMO, View DRMO/Disposal List, Manage Recycle, Add New Recycle, View Recycle List, Item Description, Make or Model, Purge Conducted By, Sanitization Method, Validation By, Nomenclature, Form 1348. Template processes. The DRMO module 312 enables DRMO process through at least one of the mobile device and a computer desktop program. Consequently, assets are placed in the DRMO process after check-in and 1348 long form is generated automatically. The signature of a logged in user is created from the mobile device thereby creating the transaction. Similarly, the Recycle process is also created automatically through at least one of the mobile device and the desktop application. Here, a sanitation form is created automatically and captures an image of the form.

The Government process 314 module includes Unit of Measure, Companies & Cages, Discount Terms, Add New Order, and Manage Government Orders process and create labels process.

Further, the Administration process 316 module deals with deal Manage Groups, Add New User, Manage Users, Add User signature image, Manage Permissions, User Interface Theme, Company Info, Database Configuration, Printer Setting processes.

ATIM web service 318 is a web service component that facilitates communication between RFID mobile and the ATIM system. Further, Common Module 320 is responsible to include reports such as Login, Dashboard and Reports processes. Correspondingly, the Common::Login 324 deals with User Login process. The Common::Dashboard 326 deals with useful and important navigation links of different functionality after login process. Further, the Common::Reports 328 includes various important reports of ATIM system.

The RFID mobile 322 is a RFID receiver which decodes the signal from RFID tags and converts associated data to a format usable by a computer. Further, the RFID mobile 322 communicates with the Asset Tracking Web service (.Net Web Service) via SOAP.

Figure 4:
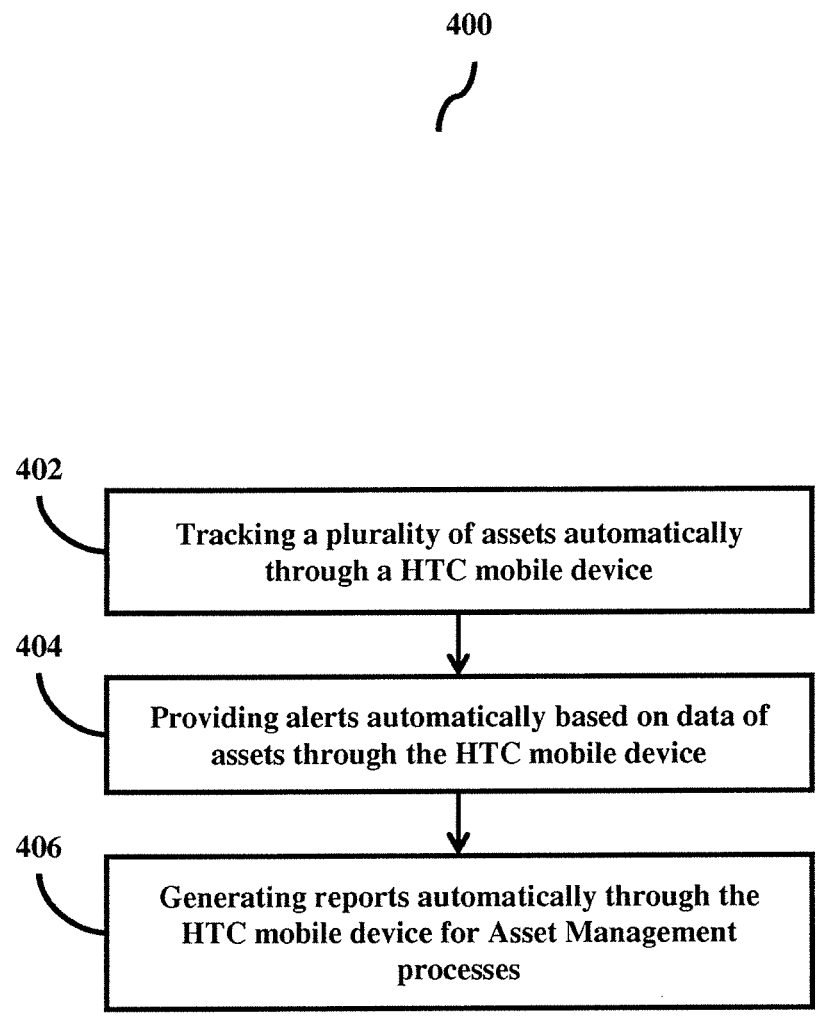
FIG. 4 is a flow diagram illustrating the method of tracking assets and managing inventory automatically through a handheld device, according to the embodiments as disclosed herein.

FIG. 4 is a flow diagram illustrating the method of tracking assets and managing inventory automatically, according to the embodiments as disclosed herein.

At step 402, a plurality of assets is tracked automatically through a mobile device. The mobile device is configured as a RFID reader and detects a RF signal from RFID tags that enters into the radio range of the mobile device. Basically, the radio range can be adjusted so that it defines an area in the enterprise. The RFID tags are attached to the plurality of assets. Using RFID tags and RFID readers, assets can be secured and tracked automatically as they move around.

Once the assets are tracked, corresponding RF signals are decoded to retrieve data. The data is then stored in a database. Further, the data describes a complete life cycle of the assets.

At step 404, alerts are provided automatically based on data of assets through the mobile device. Once the RFID reader receives the RF signal, the RF signal is decoded to obtain data of corresponding assets. Based on the data, appropriate alerts are sent through the mobile device.

The assets data is then stored in a database for further purposes. The database is constantly updated. As a result, the assets are tracked automatically during movement. The data is also stored on the mobile device.

The assets are imported automatically to capture all information through the mobile device. Further, signatures are captured automatically from the user through at least one of the mobile device and desktop application.

At step 406, reports are generated automatically through the mobile device for various Asset Management processes. In a preferred embodiment, the method of tracking assets and managing inventory described above is used for Government Assets. All the Government Asset Management processes are converted into electronic form, thereby eliminating the necessity of paper and pen. All the Government forms are automated through the mobile device and later transferred to the complete desktop application with minimal user entry. The Government is free from generating reports manually, exporting reports to excel from various applications and printing and signing forms manually. Moreover, full accountability of all the Government Assets through the mobile device. Conclusively, the method provides a complete process for all the Government management assets allowing the Government to completely account, dispose, checkout, checkin and track assets through the mobile device.

Further, the method can be implemented in various applications as mentioned below:
1. Room and Asset Barcode Label Printing
2. Barcode customization
3. MilSpec barcodes preloaded
4. Printing of Multiple barcodes contiguously
5. Tracking using Mobile Device
6. RFID tracking
7. Robust Reporting 8. Creation and exporting reports to excel, buy user defined fields
9. Check-in/Check-out
10. Check-out by project
11. Bill of materials
12. Import new assets from a spread sheet or list
13. Asset categories and subcategories
14. Inventory Management & Supplies
15. Inventory Transfer Process
16. Send re-order notices when quantities reach threshold
17. Automatically deduct from stock-on-hand at check out.
18. Allocate use to user or department
19. Condition of the asset at time of check-in or check-out
20. Check-out & check-in history
21. Assign asset to a user or borrower
22. Purchasing History
23. 1348 Forms automatic issuance from or Desktop Application
24. DRMO/Disposal/Recycle Process.

Figure 5:
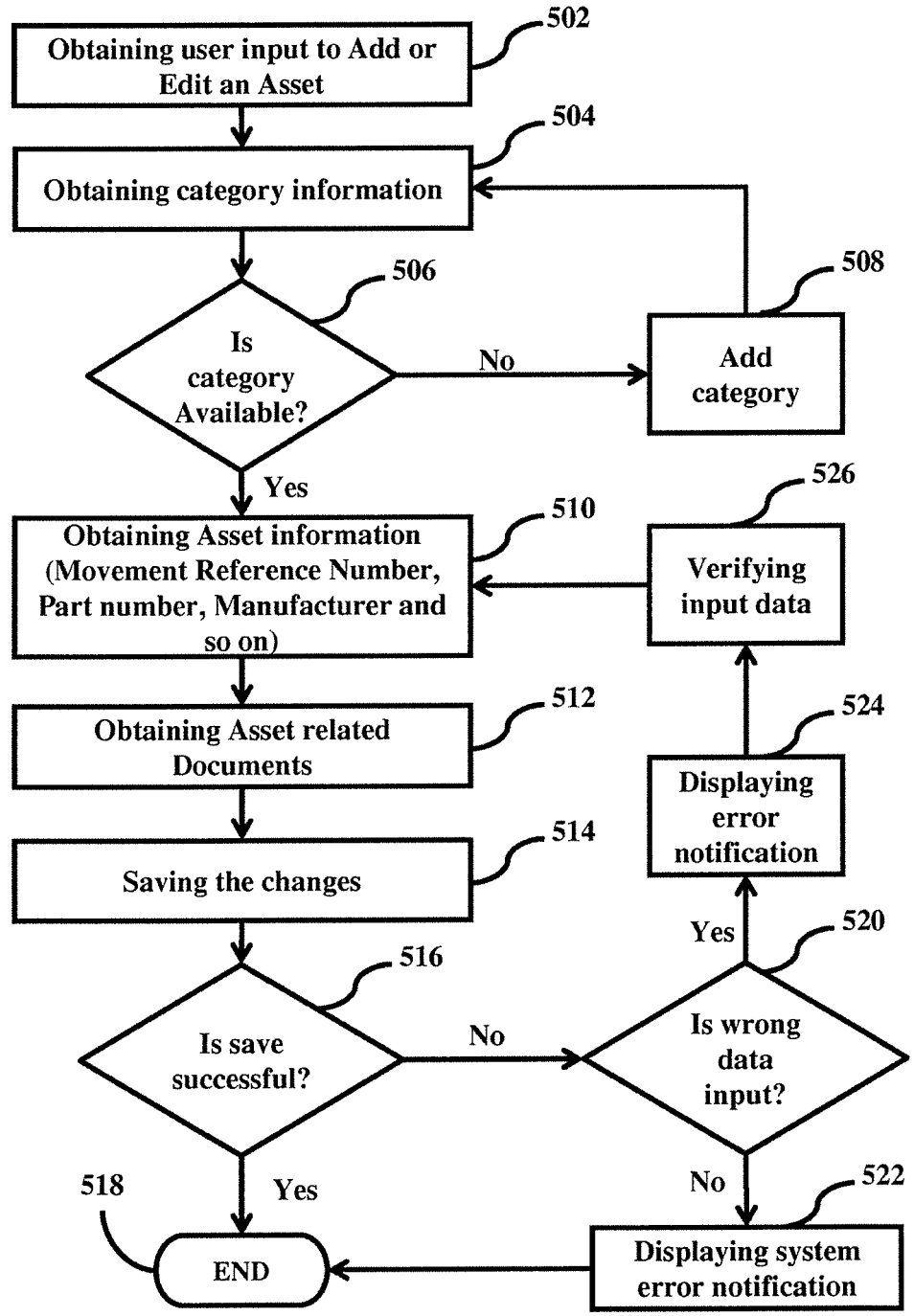
FIG. 5 is a flow diagram depicting an exemplary asset management procedure of adding and editing assets, according to embodiments as disclosed herein.

FIG. 5 is a flow diagram depicting an exemplary asset management process of adding and editing assets, according to embodiments as disclosed herein. The flow diagram begins at step 502. At step 502, user input to add or edit an asset is obtained.

At step 504, category information is obtained.

At step 506, if category of the asset is available, step 510 is performed. Else step 508 is performed. At step 508, a new category is added. Further, at step 510, asset information is obtained. The asset information includes movement reference number, part number, manufacturer and so on.

At step 512, asset related documents are obtained.

At step 514, subsequent changes are saved. As a result, assets can be successfully added or edited.

At step 516, if the changes to an asset are successful, the flow diagram ends at step 518. Else step 520 is performed.

At step 520, if wrong data was inputted, step 524 is performed. Else step 522 is performed. At step 522, a system error is notified. However, at step 524, an error is notified to the user. At step 526, input data is verified and subsequently step 510 is repeated.

The flow diagram ends at step 518.

Figure 6:
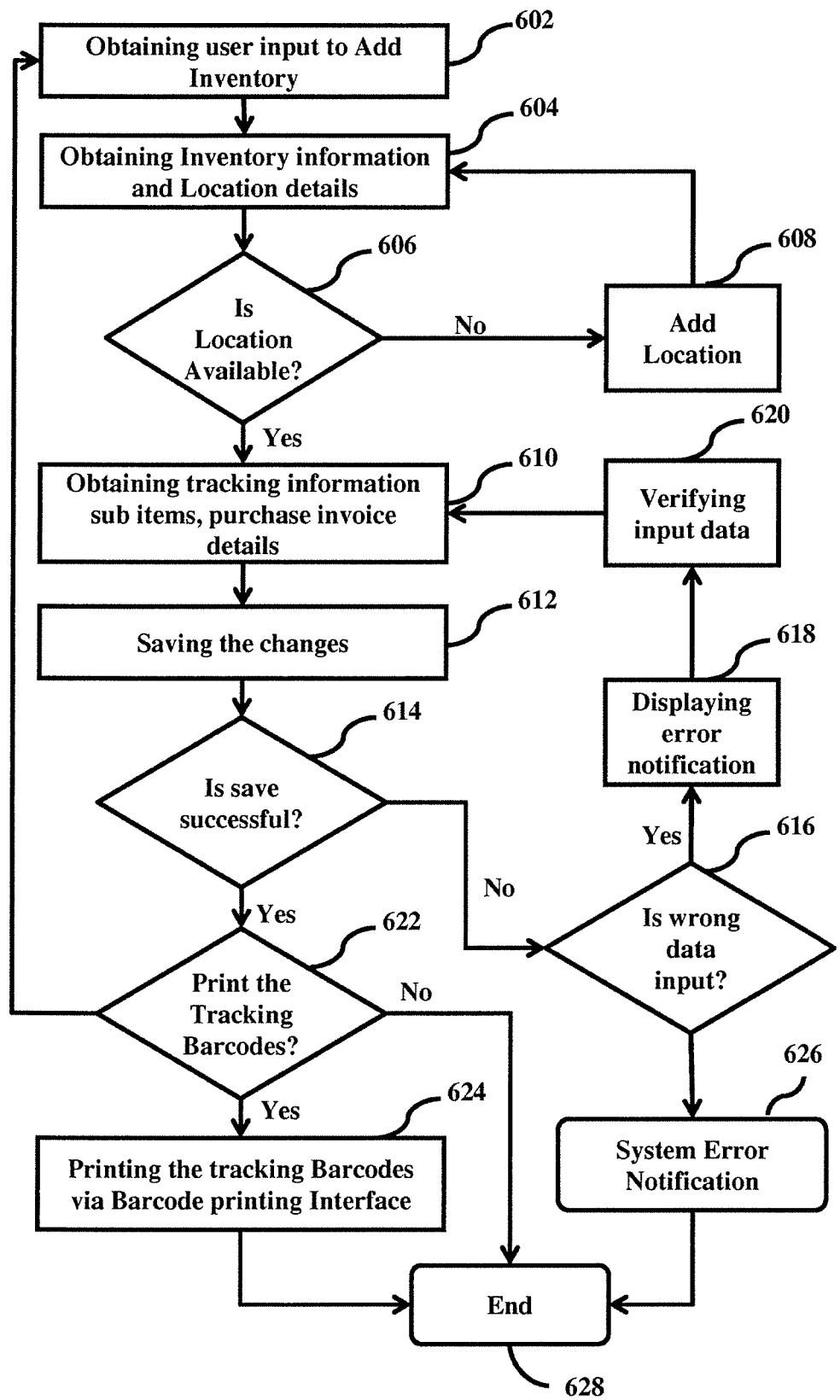
FIG. 6 is a flow diagram depicting an exemplary asset management procedure of adding inventory and printing barcode, according to embodiments as disclosed herein.

FIG. 6 is a flow diagram depicting an exemplary asset management procedure of adding inventory and printing barcode, according to embodiments as disclosed herein. The flow diagram begins at step 602. At step 602, user input to add inventory is obtained.

At step 604, inventory information and location details are obtained from a database.

At step 606, if location is available, step 610 is performed. Else step 608 is performed. At step 608, the new location is added and consequently, step 604 is repeated. At step 610, tracking information of sub items and purchase invoice details are obtained.

At step 612, corresponding changes are saved.

At step 614, if the changes are saved successfully, step 622 is performed. Else step 616 is performed. At step 622, if the tracked barcodes are to be printed, step 624 is performed. Else the method ends at step 628. At step 624 the tracked barcodes are printed via a barcode printed interface.

At step 616, if incorrect data has been inputted, step 618 is performed. Else step 626 is performed. At step 618, an error notification is displayed. Subsequently, at step 620, input data is verified and then step 610 is repeated. At step 626, system error is notified.

At step 628, the flow diagram ends.

Figure 7:
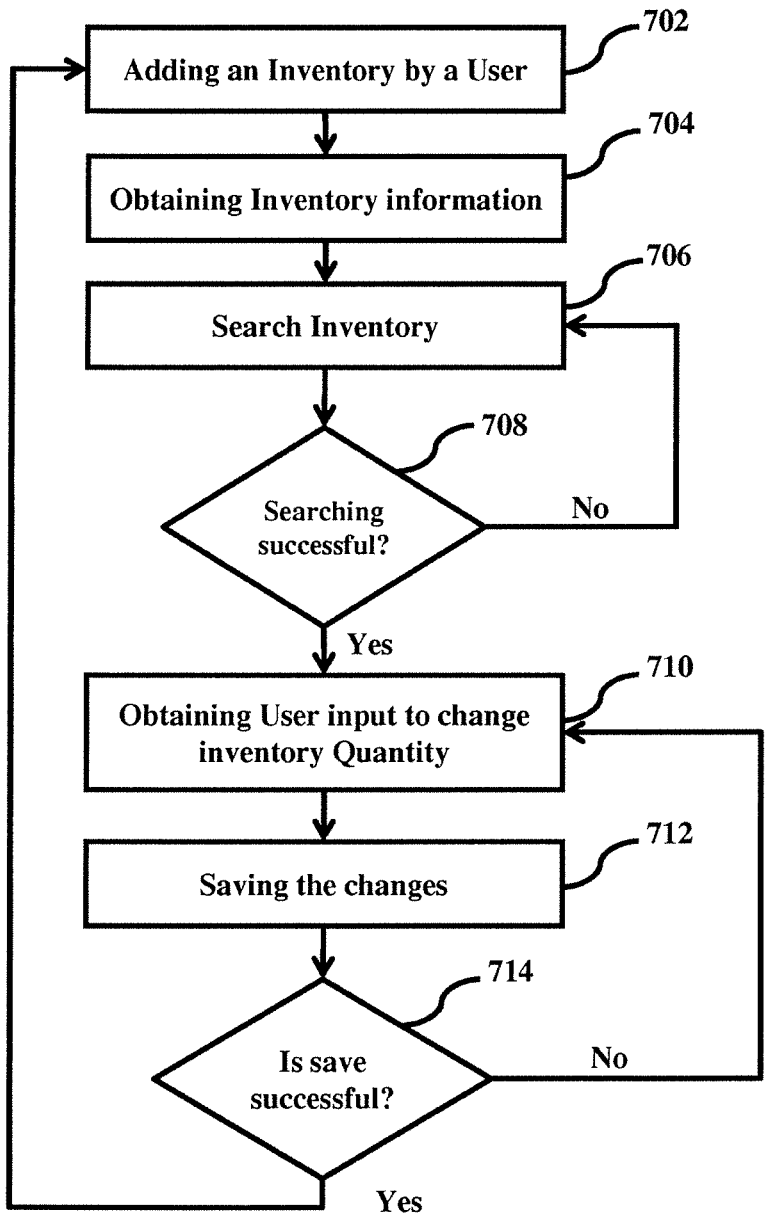
FIG. 7 is a flow diagram depicting an exemplary asset management procedure of searching inventory and changing inventory quantity, according to embodiments as disclosed herein.

FIG. 7 is a flow diagram depicting an exemplary process of asset management searching inventory and changing inventory quantity, according to embodiments as disclosed herein. The flow diagram begins at step 702. Step 702 is a predefined process that describes a successful added inventory.

At step 704, inventory details are obtained from a system database.

At step 706, inventory is searched.

At step 708, if the search for inventory is successful, step 710 is performed. Else step 706 is performed. At step 710, user input is obtained to change the inventory quantity.

At step 712, the changes are saved.

At step 714, is the changes are saved successfully, step 702 is repeated. Else step 710 is repeated.

Figure 8:
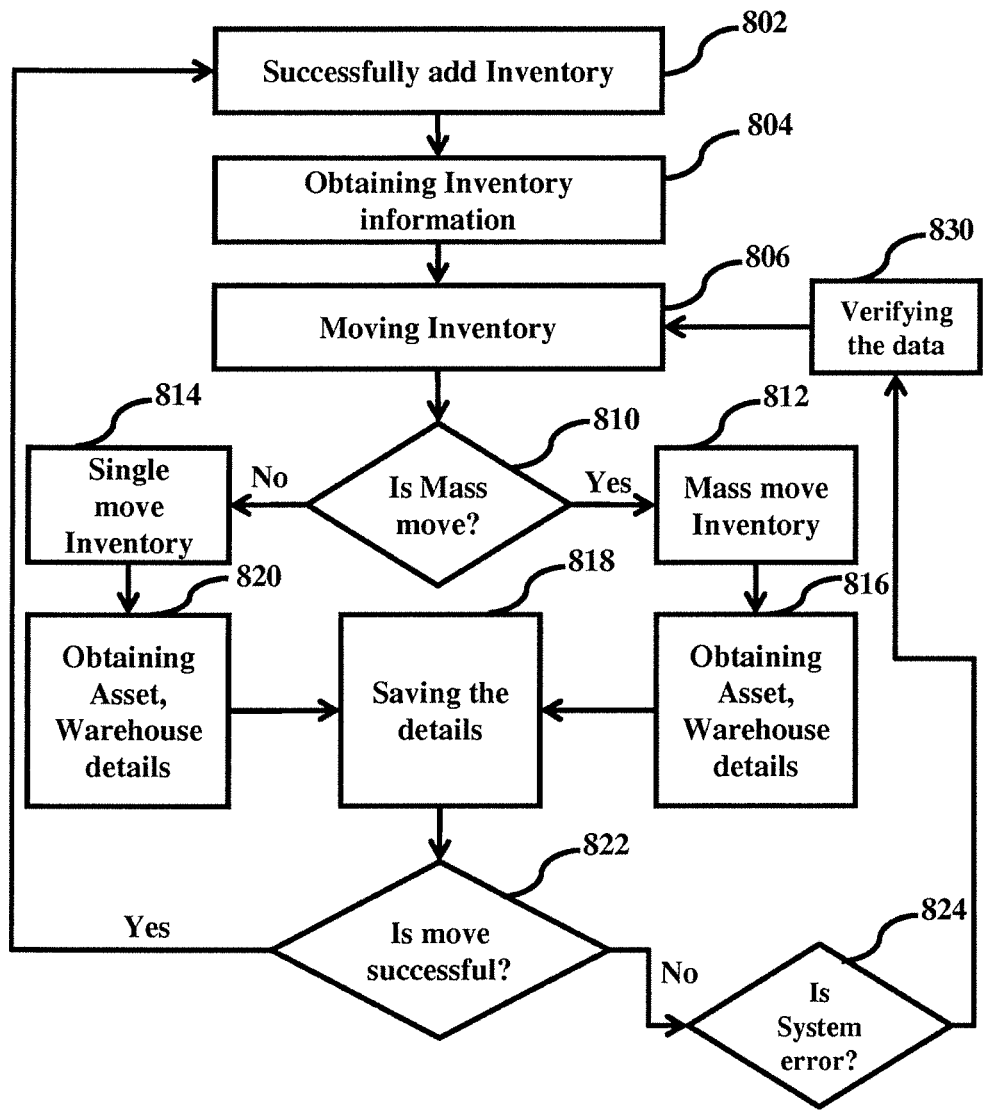
FIG. 8 is a flow diagram depicting an exemplary asset management procedure of moving inventory, according to embodiments as disclosed herein.

FIG. 8 is a flow diagram depicting an exemplary asset management procedure of moving inventory, according to embodiments as disclosed herein. Step 802 is a predefined process that describes a successful added inventory.

At step 804, inventory information is obtained from a system database.

At step 806, Inventory is moved.

At step 810, if mass is moved, step 812 is performed. Alternatively, step 814 is performed. At step 812, mass inventory is moved. Consequently, step 816 is performed. At step 816, corresponding assets are obtained and warehouse details are also obtained. Further, at step 818, the details are saved.

At step 814, a single Inventory is moved.

At step 820, corresponding assets and warehouse details are obtained. Further, the details are saved at step 818.

At step 822, if the Inventory is moved successfully, step 802 is repeated. Else step 824 is performed. At step 824, if a system error occurs, step 830 is performed. At step 830, the data is verified and subsequently step 806 is repeated.

Figure 9:
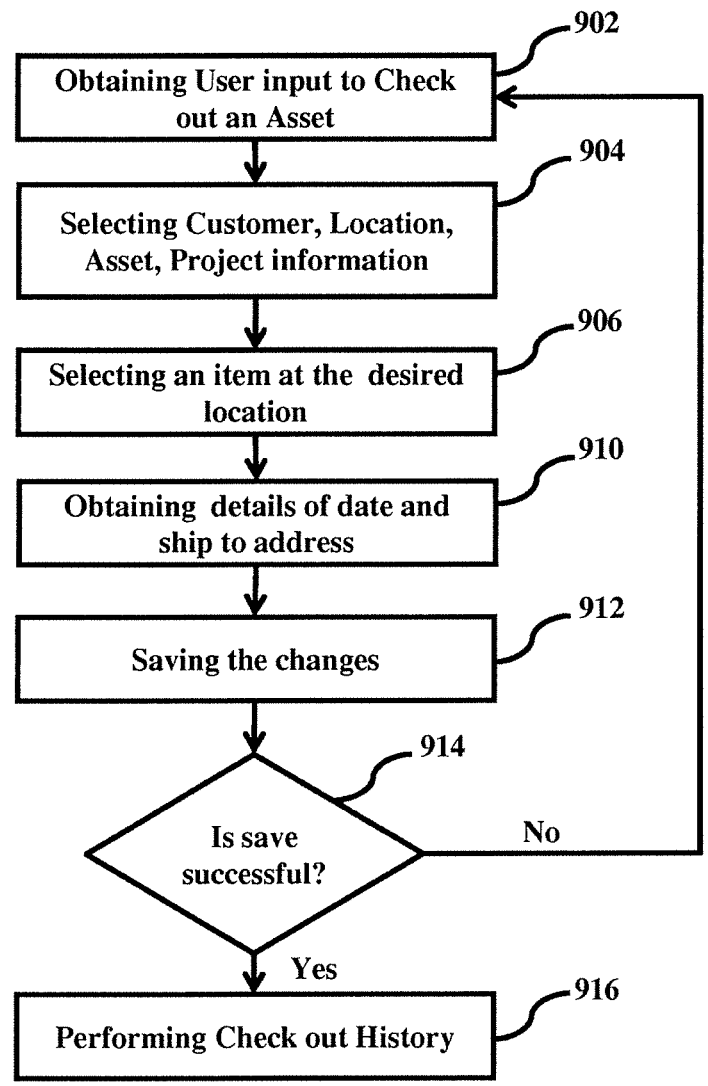
FIG. 9 is a flow diagram depicting an exemplary asset management procedure of check-out process, according to embodiments as disclosed herein.

FIG. 9 is a flow diagram depicting an exemplary asset management procedure of check-out process, according to embodiments as disclosed herein. The flow diagram begins at step 902. At step 902, user information is obtained to Check Out an asset.

At step 904, various information, such as customer information, location information, asset information and project information are selected.

At step 906, an item is selected at the desired location.

At step 910, details of the shipping date and corresponding shipping address are obtained.

At step 912, the changes are saved.

At step 914, if the changes are saved successfully, step 916 is performed. Else step 902 is repeated.

Figure 10:
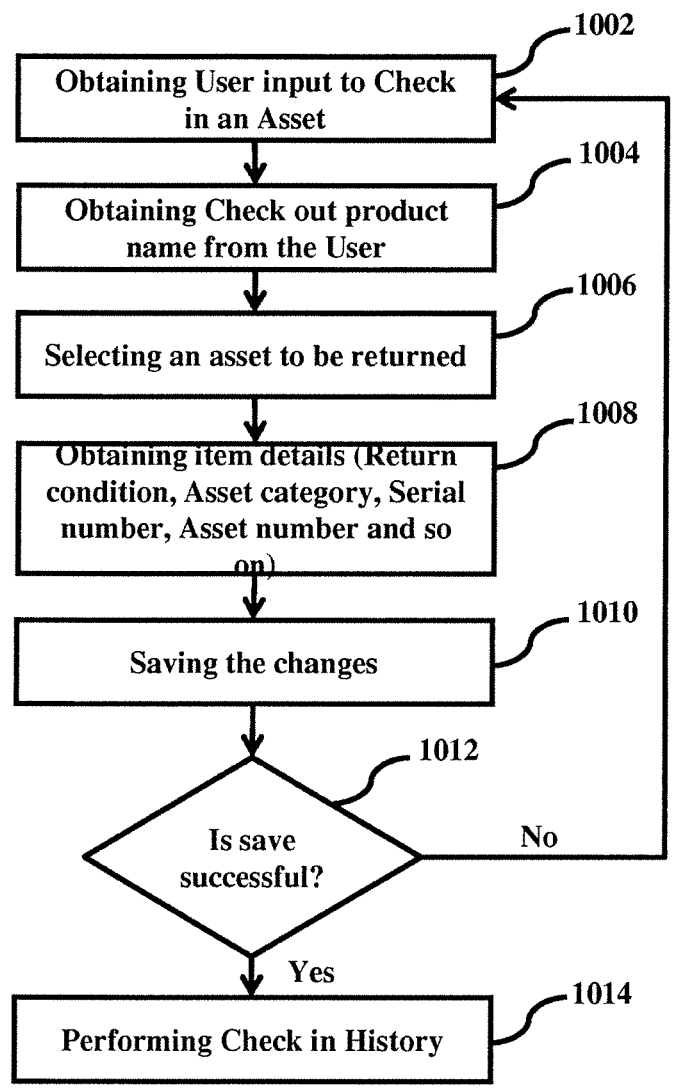
FIG. 10 is a flow diagram depicting an exemplary asset management procedure of check-in process, according to embodiments as disclosed herein.

FIG. 10 is a flow diagram depicting an exemplary asset management procedure of check-in process, according to embodiments as disclosed herein.

At step 1002, user information is obtained to check in an asset.

At step 1004, check out product name is obtained from the user.

At step 1006, an asset to be returned is selected.

At step 1008, asset details are obtained. The details include return condition, asset category, serial number, asset number and so on.

At step 1010, the changes are saved.

At step 1012, if the changes are saved successfully, step 1014 is performed. Else step 1002 is repeated. At step 1014, Check In history is performed.

Figure 11:
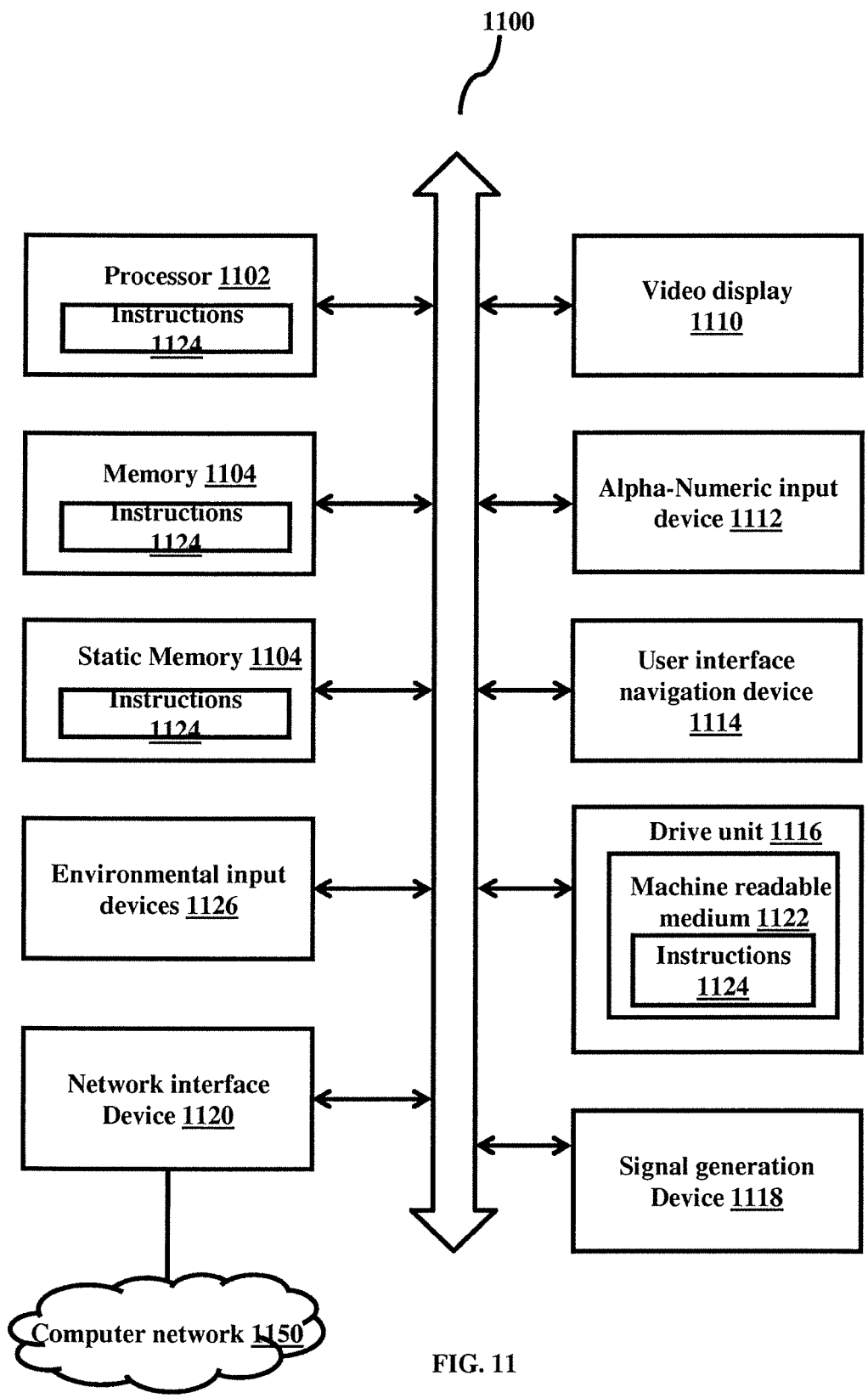
FIG. 11 illustrates a block diagram of a machine to implement the application, according to embodiments disclosed herein.

FIG. 11 illustrates a block diagram of a machine to implement the application, according to embodiments disclosed herein. FIG. 11 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120. The computer system 1100 may also include an environmental input device 1126 that may provide a number of inputs describing the environment in which the computer system 1100 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 1124 may further be transmitted or received over a computer network 1150 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although various components are illustrated herein as separate entities, each illustrated component represent a collection of functionalities which can be implemented as software, hardware, firmware or any combination of these. Where a component is implemented as software, it can be implemented as a stand-alone program, but can also be implemented in other ways, for example as part of a larger program, as a plurality of separate programs, as a kernel loadable module, as one or more device drivers or as one or more statically or dynamically linked libraries.

Accordingly, the disclosure of the present invention is intended to be illustrative, but not limiting, of the scope of the invention, which is set forth in the following claims.

What is claimed is:

1. A computer-implemented method for automatically tracking and managing a plurality of assets via a computing device, comprising:
   storing, in a database, a first asset data set concerning a first asset and a second asset data set concerning a second asset, the first asset data set including a first asset identity and a first asset status, the second asset data set including a second asset identity and a second asset status, first and second computer readable tags being disposed on respective ones of the first and second assets;
   storing a standardized form template in a database, the standardized form template comprising a plurality of information blocks and being adapted to be used to document any one of a plurality of asset tracking transactions;
   receiving identity input indicating that the computing device has read the first computer readable tag;
   receiving a user input via the computing device, the user input being associated with the identity input, and the user input identifying an asset tracking transaction, a user identity, and a transaction data;
   associating the user input with the first asset data set;
   automatically selecting one of a plurality of electronically-stored asset management processes based upon the asset tracking transaction identified in the user input;
   automatically populating a plurality of the information blocks of the standardized form template with the transaction data, user identity and first asset identity in compliance with the selected one of the plurality of electronically-stored asset management processes to create a completed form;
   saving the completed form in the database; and
   creating an updated first asset status based on the asset tracking transaction and transaction data, and saving the updated first asset status in the first asset data set.

2. The method as in claim 1, wherein automatically populating the plurality of the information blocks comprises copying at least a portion of the first asset data set to one or more of the plurality of blocks in compliance with the selected one of the plurality of electronically-stored asset management processes.

3. The method as in claim 2, additionally comprising associating a location information based on a location of the computing device with the identity input when the computing device reads the first computer readable tag, and associating the location information with the first asset data set after the computing device has read the first computer readable tag.

4. The method as in claim 3, wherein the computing device is disposed at a first location, and additionally comprising storing, in a database, a first location inventory including a plurality of assets disposed at the first location, wherein the first asset is included in the first location inventory.

5. The method as in claim 4, wherein the identified asset tracking transaction is a check-out, and additionally comprising automatically removing the first asset from the first location inventory.

6. The method as in claim 5, wherein the transaction data additionally comprises a borrower information.

7. The method as in claim 4, wherein the identified asset tracking transaction is a disposal or recycle transaction, and additionally comprising automatically removing the first asset from the first location inventory and updating the first asset status to indicate that the first asset has been disposed of or recycled.

8. The method as in claim 4, wherein the identified asset tracking transaction is a check-in, and additionally comprising automatically adding the first asset to the first location inventory.

9. The method as in claim 8, additionally comprising the user entering condition data concerning the first asset into the computing device, wherein the condition data is included in the user input, and comprising automatically saving the condition data in the first asset data set.

10. The method as in claim 1, wherein each of the first and second computer-readable tags comprises an RFID tag, and each of the first and second asset data sets comprises a code corresponding to the respective one of the RFID tags disposed on the corresponding first and second assets, and comprising the computing device generating the identity input after reading the RFID tag of the first asset.

11. The method as in claim 10, additionally comprising adjusting a radio range of the computing device so that the computing device reads the first computer readable tag but not the second computer readable tag.

12. The method as in claim 1, wherein the identified asset tracking transaction is an assignment to a first project, and additionally comprising adding an indication in the updated first asset status that the first asset is assigned to the first project.

* * * * *